US005896954A

United States Patent [19]

Colby et al.

[11] Patent Number: 5,896,954

[45] Date of Patent: Apr. 27, 1999

[54] AUTOMATIC FINE TUNING OF ROTOR TIME CONSTANT IN FIELD-ORIENTED ELEVATOR MOTOR DRIVE

[75] Inventors: Roy Stephen Colby, Raleigh, N.C.; Alberto Vecchiotti, Middletown; Neil Greiner, New Britain, both of Conn.

[73] Assignee: Otis Elevator Company, Farmington, Conn., CT

[21] Appl. No.: 08/996,263

[22] Filed: Dec. 22, 1997

[51] Int. Cl.[6] .................................. B66B 1/28; H02P 5/28

[52] U.S. Cl. ........................... 187/391; 187/296; 318/807

[58] Field of Search ..................................... 187/289, 391, 187/296; 318/807, 855

[56] References Cited

U.S. PATENT DOCUMENTS

| | | | |
|---|---|---|---|
| 5,476,158 | 12/1995 | Mann et al. | 187/289 |
| 5,510,689 | 4/1996 | Lipo et al. | 318/809 |
| 5,796,236 | 8/1998 | Royak | 318/804 |

OTHER PUBLICATIONS

M. Depenbrock and N.R. Klaes, *Determination of the Induction Machine Parameters and their Dependencies on Saturation*, Ruhr–University Bochum, Germany, pp. 17–22.

N.R. Klaes, Parameter Identification of an Induction Machine with Regard to Dependencies on Saturation, IEEE Transactions on Industry Application, vol. 29, No. 6, Nov. 1993.

A.M. Khambadkone and J. Holtz, Vector–Controlled Induction Motor Drive with a Self–Commissioning Scheme, IEEE Transactions on Industrial Electronics, vol. 38, No. 5, Oct. 1991.

J. Holtz and T. Thimm, Identification of the Machine Parameters in a Vector–Controlled Induction Motor Drive, IEEE Transactions on Industry Applications, vol. 27, No. 6 Nov./Dec. 1991.

T. Rowan, R. Kerkman and D. Leggate, A Simple On–Line Adaption for Indirect Field Orientation of an Induction Machine, IEEE Transactions on Industry Applications, vol. 27, No. 4 Jul./Aug. 1991.

R. Kerkman, J. Thunes, T. Rowan and D. Schlegel, A Frequency–Based Determination of Transient Inductance and Rotor Resistance for Field Commissioning Purposes, IEEE Transactions on Indusry Applications, vol. 32, No. 3, May/Jun. 1996.

H. Schierling, Self–Commissioning –A Novel Feature of Modern Inverter–Fed Induction Motor Drives, pp. 287–290.

M. Sumner and G. Asher, Autocommissioning for voltage–referenced voltage–fed vector–controlled induction motor drives, IEEE Proceedings, vol. 140, No. 3, May 1993.

Kudor et al, Self–Commissioning for Vector Controller Inductor Motors, IEEE 1993, pp. 528–535.

Tungpimolrut et al, A Direct Measuring Method of Machine Parameters for Vector–Controlled Induction Motor Drives, 1993 IEEE pp. 997–1002.

Green et al, Measurement and On–line Estimation Approaches to a Parameter Variation in Vector Controllers, IEEE Colloq. 1993. pp. 3/1–3/5.

Wade et al, Parameter Identification for Vector Controlled Induction Machines, Heriot–Wat University, UK, pp. 1187–1192.

(List continued on next page.)

*Primary Examiner*—Robert E. Nappi

[57] ABSTRACT

An elevator controller 7 is provided with logic 48 which automatically calculates a motor time constant ($\tau_R$) for a field-oriented current regulator/motor drive 20 by running the elevator up and down while computing an average of a sign-adjusted error signal $DXD_{ERR}$ for the up/down run and while varying $\tau_R$ and determining the value of $\tau_R$ at which the average of $DXD_{ERR}$ for the up and down runs equals zero within a predetermined tolerance. Alternatively, instead of computing the average of $DXD_{ERR}$, a single elevator run may be used to determine the value of $\tau_R$ at which $DXD_{ERR}$ equals zero within a predetermined tolerance.

10 Claims, 6 Drawing Sheets

OTHER PUBLICATIONS

Bunte et al, Parameter Identification of an Inverter–fed Induction Motor at Standstill with a Correlation Method, Universal Paderborn –Germany, The European Power Electornics Association 1993, pp. 97–102.

Wang et al, An Automated rotor time Constant Measurement System for Indirect Field–Oriented Drives, IEEE Transaction on Industry Applications, vol. 24, No. 1, Jan./Feb. 1988.

Lorenz, Tuning of Field–Oriented Induction Motor Controllers for High–Performance Applications, IEEE Transactions on Industry Applications, vol. 1A–22, No. 2, Mar./Apr. 1986.

D.W. Novotny and T.A. Lipo, Vector Control and Dynamics of AC Drives, Oxform Science Publications, pp. 205–251.

DeDoncker et al, The Universal Field Oriented Controller, University of Wisconsin.

Lorenz et al, A control systems Perspective of field oriented Control for AC Servo Drives, University of Wisconsin.

Novotny and Lipo, WEMPEC, Wisconsin Electric Machines and Power Electronics Consortium, Tutorial Report, Chapter 4–1 –4–73.

AUTOMATIC FINE TUNING OF ROTOR TIME CONSTANT IN FIELD-ORIENTED ELEVATOR MOTOR DRIVE

CROSS REFERENCES TO RELATED APPLICATIONS

Co-pending U.S. Patent Applications, Serial Nos. (Otis Docket Nos. OT-3066, OT-3064, OT-3054, OT-4047, OT-4046), filed contemporaneously herewith, contain subject matter related to that disclosed herein.

TECHNICAL FIELD

This invention relates to automatic calibration of a motor/drive system and more particularly to fine tuning of a rotor time constant in a field-oriented (or vector-controlled) elevator motor drive.

BACKGROUND OF THE INVENTION

It is known that an indirect field-oriented (or vector-controlled) motor drive provides high performance torque control of an induction motor drive. It is also known in the art of elevator motor controllers to use indirect field-oriented drives to control an elevator induction motor. Such drives are multi-speed variable frequency drives. It is further known that such drives require precise knowledge of the rotor time constant of the motor to establish field orientation.

One technique to accurately determine the rotor time constant is to analyze the motor in an engineering laboratory using expensive test equipment and several engineering man-hours. However, in modernization or retrofit applications, where a new drive replaces an older drive in an existing elevator system, it is not convenient or cost effective to remove the motor or uncouple the motor from the elevator for evaluation of the rotor time constant parameter.

Another technique to determine the rotor time constant involves dispatching a highly skilled engineer to the job site to tune the drive to the motor using special test equipment. However, such a technique is costly and time consuming and, as such, makes modernizing elevator motor drives unattractive for building owners.

Also, various techniques have been described for modeling the rotor time constant of the motor. One technique is described in T. M. Rowan, "A Simple On-Line Adaption for Indirect Field Orientation of an Induction Machine", IEEE Transactions on Industry Applications, Vol. 27, No. 4, July/August 1991; however, such technique does not provide accurate gain adjustment when the direction of rotation of the motor is reversed, such as occurs with elevator motors which are bi-directional. Another technique is described in C. Wang, et al, "An Automated Rotor Time Constant Measurement System for Indirect Field-Oriented Drives", IEEE Transactions on Industry Applications, Vol. 24, No. 1, January/February 1988; however, such technique requires that the torque constant and load inertia are accurately known beforehand.

DISCLOSURE OF THE INVENTION

Objects of the invention include provision of automatic, on-site, fine-tuning of a rotor time constant parameter of a motor in field-oriented drives for elevators, which does not require removal or uncoupling of the motor from the elevator system.

According to the present invention, a method for calculating a rotor time constant ($\tau_R$) of an elevator motor operated by a field-oriented controller, includes: a) setting $\tau_R$ to an initial value; b) running the elevator in a first direction; c) calculating an error signal ($V_{dERR}$) during the elevator run as follows: $V_{dERR}=Vd-R_1Id+(\omega_R+Iq/(Id\tau_R))L\sigma Iq$, where: Id=d-axis current, Iq=q-axis current, Vd=d-axis voltage, $\omega_R$=motor speed, $R_1$=motor stator resistance, $L\sigma$=motor transient inductance, where Vd, Id, Iq, $\omega_R$, are signals provided by the field-oriented controller, where $R_1$ and $L\sigma$ are predetermined motor constants; d) calculating a sign-adjusted error signal ($DXD_{ERR}$) during the elevator run as follows: $DXD_{ERR}=V_{dERR}\times$(sign of Iq)$\times$(sign of $\omega_R$); and e) varying $\tau_R$, performing steps (b)–(d), and determining the value of $\tau_R$ at which $DXD_{ERR}$ equals zero, within a predetermined tolerance.

According further to the present invention, the step of varying (e) comprises: f) varying $\tau_R$ until $DXD_{ERR}$ changes sign; and g) performing a search algorithm to determine the value of $\tau_R$ at which $DXD_{ERR}$ crosses through zero, within a predetermined tolerance.

The invention represents a significant improvement over the prior art by allowing the rotor time constant in field-oriented (or vector controlled) elevator motor drives to be automatically fine-tuned at the job site. The invention does not require removing the motor from the job site or uncoupling the motor from the elevator system. Thus, the invention performs such tuning under a loaded condition, not the standard no load test common for industrial drives. Also, the invention does not require a specially trained engineer with special test equipment to tune the motor/drive system. Thus, the invention allows new motors drives to be retrofit into job sites at low cost of installation and calibration. Accordingly, automatic fine-tuning of the rotor time constant at the field site saves both time and money. As a result, the present invention makes it more attractive for building owners to upgrade their elevator systems to modern controls, which are currently economically impractical due to the high cost of determining parameters of older motors found in modernization job sites. Still further, the present invention allows existing elevator motion control and safety systems to remain in place throughout the calibration procedure of the present invention.

The foregoing and other objects, features and advantages of the present invention will become more apparent in light of the following detailed description of the exemplary embodiments thereof, as illustrated in the accompanying drawings.

BEST MODE FOR CARRYING OUT THE INVENTION

Figure 1:
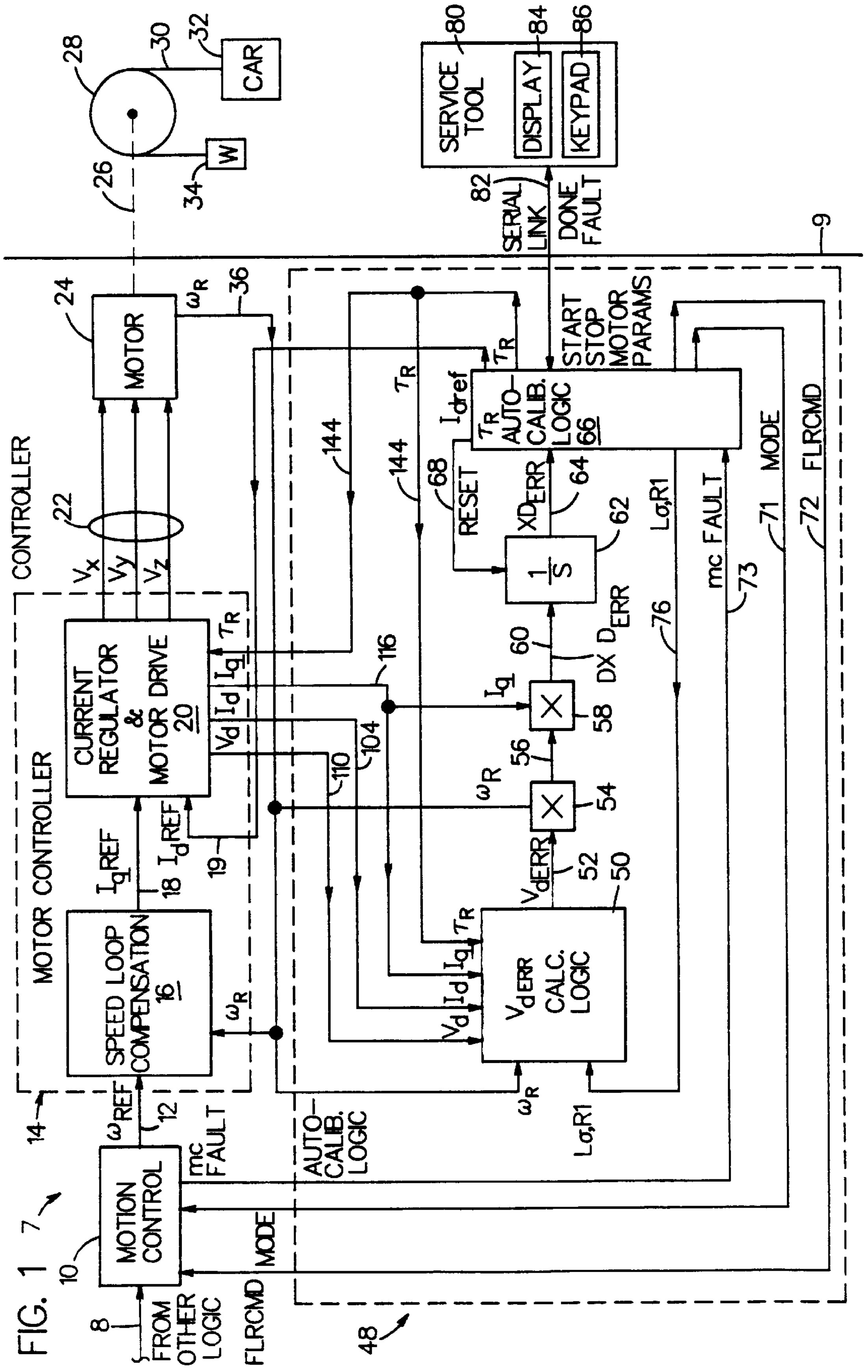
FIG. 1 is a block diagram of a controller having auto-calibration logic, in accordance with the present invention.

Referring to FIG. 1, that shown to the left of the line 9 is a portion of an elevator controller 7, which includes a motion control circuit 10 which receives floor destination commands from operational control logic (not shown) on a line 8 and provides a speed profile $\omega_{REF}$ on a line 12 to a motor controller 14. The motor controller 14 comprises speed loop compensation logic 16 which provides a current reference signal $I_{qREF}$ on a line 18 to a field-oriented current regulator/motor drive circuit 20. The circuit 20 provides 3-phase drive voltages $V_X$, $V_Y$, $V_Z$ on lines 22 to a motor 24, e.g., a three phase induction motor. The motor 24 provides a speed feedback signal $\omega_R$ indicative of the rotational speed of the motor 24 on a line 36 back to the controller 7.

Two examples of three phase AC induction motors which may be used with the present invention are, Model LUGA-225LB-04A, by Loher, having a rated power of 45 KW, rated voltage of 355 volts, rated speed of 1480, and rated frequency of 50 Hz, in a geared configuration; and Model 156MST, by Tatung (of Taiwan), having a rated power of 40 KW, rated voltage of 500 volts, rated speed of 251, and rated frequency of 16.7 Hz, in a gearless configuration. Other motors having other rated parameters may be used if desired.

The motor 24 is connected by a mechanical linkage 26, e.g., a shaft and/or a gearbox, to a sheave 28. A rope or cable 30 is wrapped around the sheave 28 and has one end connected to an elevator car 32 and the other end connected to a counterweight 34. The weight of the counterweight is typically equal to the weight of an empty car plus 40–50% of the max load in the car.

Other elevator system configurations, and with or without a counterweight, with or without a gearbox, may be used if desired to convert the output torque of the motor 24 to movement of the elevator cab 32, such as dual lift (where two elevator cars are connected to a single rope, the cars move in opposite directions and each car provides a counterweight for the other car), drum machine (where the rope is wrapped around a drum driven by a motor), etc.

The speed loop compensation logic 16 may be any motor speed control compensation logic having one or more control loops, such as a proportional-plus-integral outer loop control and a proportional inner loop control described in co-pending U.S. patent application (Docket No. OT-3054), filed contemporaneously herewith. Other motor speed control compensation may be used. The type of motor speed control compensation is not critical to the present invention.

Figure 2:
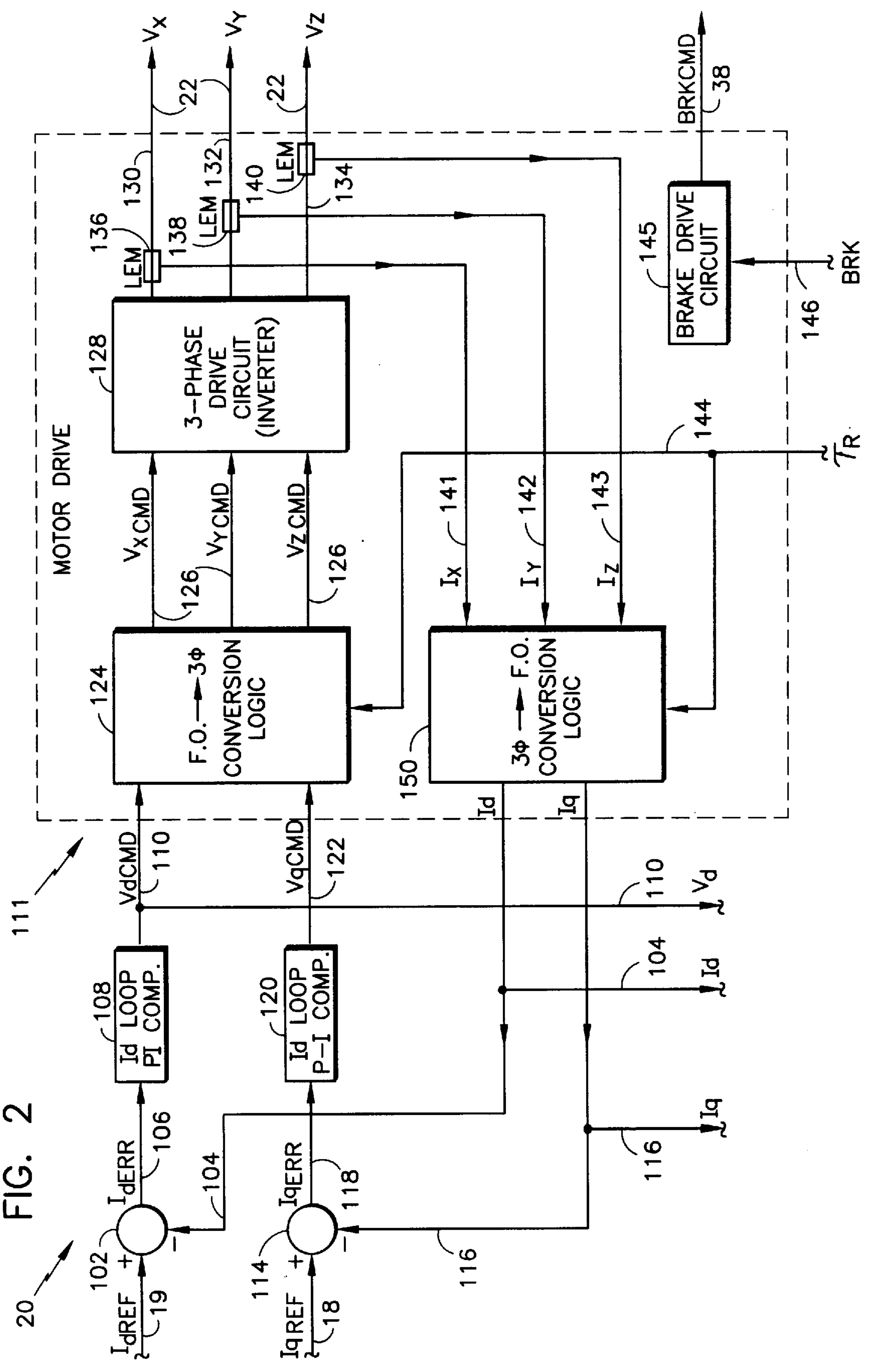
FIG. 2 is a block diagram of a field oriented current regulator/motor drive circuit within the controller of FIG. 3, in accordance with the present invention.

Referring to FIG. 2, it is known in the art of field-oriented motor control that such control uses current and voltage parameters corresponding to two axes. In particular, the field-oriented current regulator/motor drive 20 of FIG. 1 comprises two current control loops, one for the d-axis current Id and one for q-axis current Iq. The Id loop receives the $I_{dREF}$ signal on the line 19 which is fed to a positive input to a summer 102. A measured or feedback d-axis current signal Id on a line 104 is fed to a negative input to the summer 102. The output of the summer 102 is an error signal $I_{dERR}$ on a line 106 which is fed to control compensation logic 108, such as proportional plus integral current loop control. Other current loop control compensation may be used if desired. The logic 108 provides a d-axis voltage command signal VdCMD on aline 110.

For the q-axis, the Iq loop receives the $I_{qREF}$ signal on the line 18 which is fed to a positive input to a summer 114. A measured or feedback q-axis current signal Iq on a line 116 is fed to a negative input to the summer 114. The output of the summer 114 is an error signal $I_{qERR}$ on a line 118 which is fed to control compensation logic 120, e.g., proportional-plus-integral logic similar to the logic 108. The output of the logic 120 is a q-axis voltage command signal $V_{qCMD}$ on a line 122.

The voltage commands $V_{dCMD}$ and $V_{qCMD}$ are fed to known field-oriented to three-phase conversion logic 124 which converts the d-axis and q-axis voltage commands to three phase voltage commands $V_{XCMD}$, $V_{YCMD}$, $V_{ZCMD}$ on lines 126. The phase voltage commands $V_{XCMD}$, $V_{YCMD}$, $V_{ZCMD}$ are fed to a known three phase drive circuit (or inverter) 128 which provides three phase voltages $V_X$, $V_Y$, $V_Z$ on lines 130, 132, 134, respectively, to drive the motor 24 (FIG. 1).

Within the drive circuit 128 (details not shown), each of the voltage commands $V_{XCMD}$, $V_{YCMD}$, $V_{ZCMD}$ on lines 126 are converted to percent duty cycle commands indicative of the corresponding input voltage level. The percent duty cycle is converted into a pulse-width-modulated drive signal which drives power transistors to provide the pulse-width-modulated, variable frequency, three phase voltages $V_X$, $V_Y$, $V_Z$ on lines 130, 132, 134, respectively. The conversions within the drive 128 are performed using electronic components and/or software well known in the art of motor drive circuits. Any other type of drive circuit that receives input voltage commands and provides output phase voltages may be used, and the phase voltages need not be pulse-width modulated.

Phase currents $I_X$, $I_Y$, $I_Z$ associated with the voltages $V_X$, $V_Y$, $V_Z$, respectively, are measured by known current sensors 136, 138, 140, e.g., closed-loop Hall-effect current sensors (such as LEMS), respectively, and are provided on lines 141, 142, 143, respectively. The phase currents $I_X$, $I_Y$, $I_Z$ are fed to known three phase to field oriented conversion logic 150, which provides a known conversion from phase currents to d and q axis currents Id,Iq on the lines 104,116 which are fed to the summers 102,114, respectively, as feedback currents.

The converters 124,150 provide known conversions between vector (d and q axis) parameters and per-phase parameters, such as that described in D. Novotny, et al, "Vector Control and Dynamics of AC Drives", Oxford University Press, 1996, Ch 5, pp 203–251. The converters 124,150 may likely implement such conversions in software using a microprocessor or the like.

It is known in the art of field oriented drives that the value of the rotor time constant $\tau_R$ of the motor being controlled is required to perform the conversion to and from the field oriented d and q axes. In particular, $\tau_R$ is used to establish the correct slip frequency $\omega_S$ to achieve field orientation. The value of the rotor time constant $\tau_R$ is provided to the two converters 124, 150 on a line 144.

Referring to FIG. 1, the present invention comprises auto-calibration logic 48 which automatically determines the correct value of the rotor time constant $\tau_R$, discussed more hereinafter. The logic 48 comprises known electronic components, which may include a microprocessor, interface circuitry, memory, software, and/or firmware, capable of performing the functions described herein.

Figure 3:
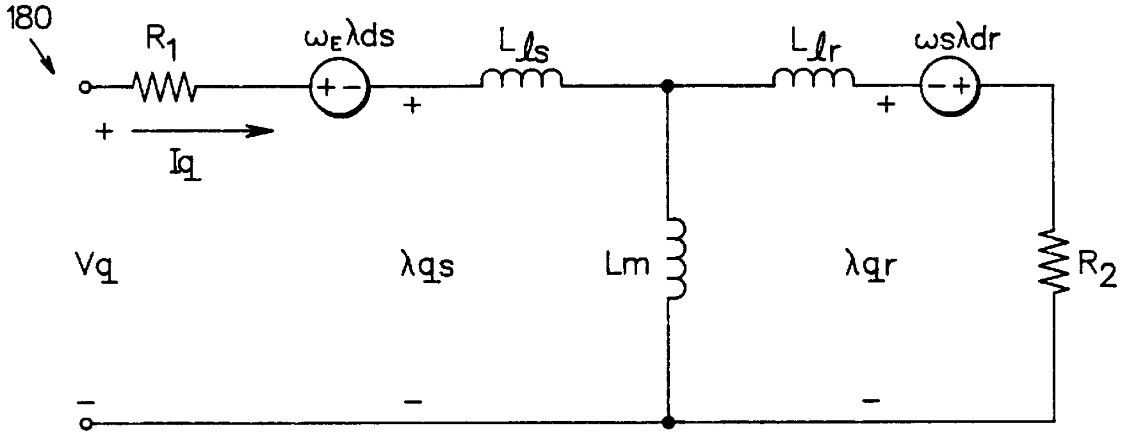
FIG. 3 is an induction motor coupled circuit diagram for q-axis variables for a field-oriented driven motor, in accordance with the present invention.
Figure 4:
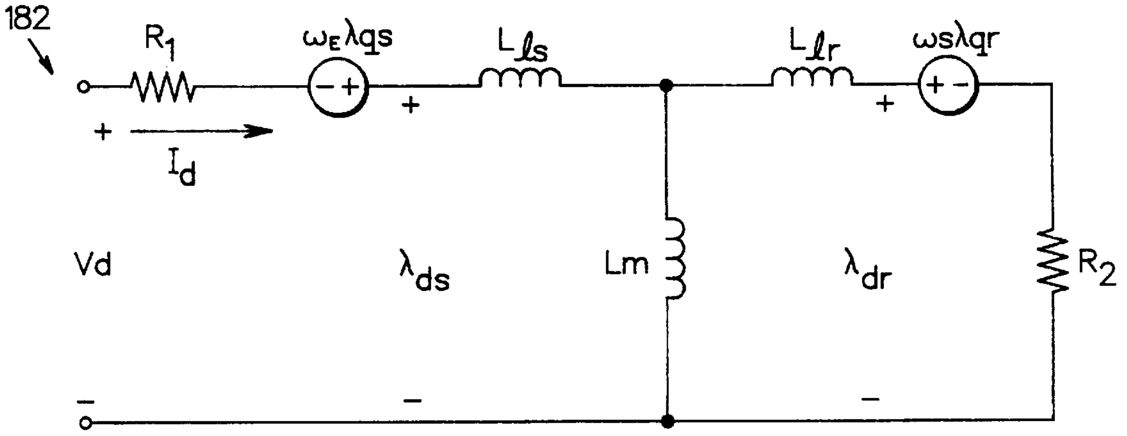
FIG. 4 is an induction motor coupled circuit diagram for d-axis variables for a field-oriented driven motor, in accordance with the present invention.

Referring to FIGS. 3 and 4, coupled circuit diagrams 180,182, for q-axis and d-axis variables, respectively, for a field-oriented driven motor, have circuit parameters defined as follows:

Id=d-axis (or magnetizing) current; Iq=q-axis (or torque) current;

Vd=d-axis voltage; Vq=q-axis voltage;

$R_1$=stator resistance;

$L_{1s}$=stator leakage inductance; $L_{1r}$=rotor leakage inductance;

Lm=mutual inductance;

$\lambda_{ds}$=d-axis stator flux; $\lambda_{dr}$=d-axis rotor flux;

$\lambda_{qs}$=q-axis stator flux; $\lambda_{qr}$=q-axis rotor flux;

$\omega_S$=slip frequency; $\omega_E$=electrical frequency of the motor currents; and $R_2$=rotor resistance.

For field orientation conditions to exist, as is known, the induction motor coupled circuit diagrams of FIGS. 3 and 4 require that $\lambda_{qr}=0$, $\lambda_{dr}=LmId$, $\lambda_{qs}=L\sigma Iq$ and $\lambda_{ds}=LsId$, where $Ls=Lm+L_{1s}$, and where Lσ is the transient inductance of the motor.

The variable frequency drive described herein operates with a constant magnetizing current Id. All current and voltage motor parameters designated herein by a subscript "r" or "R" are rotor parameters, and all other current and voltage motor parameters, unless described otherwise, are stator parameters.

Also, in a field oriented drive, as is known, the controller reference frame is oriented so that the d-axis is aligned with the rotor flux. Referring to FIG. 4, in steady state, where the transients have stabilized (i.e., dId/dt=0 and dIq/dt=0), the voltage across the inductors is 0v. Thus, the equation for the d-axis stator voltage Vd for a field-oriented drive is defined as:

$$Vd=R_1Id-\omega_E L\sigma Iq \quad \text{Eq. 1}$$

where Lσ is the transient inductance of the motor, $R_1$ is the stator resistance, $\omega_E$ is the electrical frequency of the motor currents, and Id and Iq are the d-axis and q-axis stator currents, respectively. It is also known that $\omega_S=\omega_E-\omega_R$ and $\omega_S=Iq/(Id\tau_R)$, where $\omega_R$ is the rotational speed of the rotor referred to an electrical reference frame, and $\omega_S$ is the slip frequency. Substituting this into equation 1 yields:

$$Vd=R_1Id-(\omega_R+Iq/(Id\tau_R))L\sigma Iq \quad \text{Eq. 2}$$

Moving the right side of Eq. 2 to the left side, we define a new parameter, $V_{dERR}$, as:

$$V_{dERR}=Vd-R_1Id+(\omega_R+Iq/(Id\tau_R))L\sigma Iq \quad \text{Eq. 3}$$

A zero value of the $V_{dERR}$ indicates that the drive is field oriented, i.e., that Equation 1 is satisfied (when core losses can be neglected). The polarity (positive or negative) of $V_{dERR}$ depends on the direction of rotation of the motor (the sign of $\omega_R$), the direction of torque (the sign of Iq), and whether the rotor time constant parameter $\tau_R$ is greater or less than the correct value. Table 1 below summarizes the conditions that determine whether the $V_{dERR}$ is positive or negative.

TABLE 1

| | Polarity of $V_{dERR}$ | | | |
|---|---|---|---|---|
| | $\omega_R > 0$ (forward rotation) | | $\omega_R < 0$ (reverse rotation) | |
| | $\tau_R$ High | $\tau_R$ Low | $\tau_R$ High | $\tau_R$ Low |
| Iq > 0 | − | + | + | − |
| Iq < 0 | + | − | − | + |

We have found from the above Table 1 that if we form the product:

$$DXD_{ERR}=V_{dERR}\times Iq\times\omega_R \quad \text{Eq. 4}$$

the sign (or polarity) of $DXD_{ERR}$ will be positive when the rotor time constant $\tau_R$ parameter is too low and negative when $\tau_R$ is too high, regardless of torque or direction. Thus, we have found that, under a motor load condition (such as with an empty car), the signal $DXD_{ERR}$ will unambiguously indicate the proper direction in which to adjust $\tau_R$ to its correct value and thus achieve field orientation. Instead of using $\omega_R$ in Eq. 4, $\omega_E$ may be used if desired.

We have also found that if the value of $DXD_{ERR}$ is integrated over an elevator run, the sign of the result $XD_{ERR}$ will indicate how to adjust $\tau_R$ to obtain the correct value. If the value of $XD_{ERR}$ is positive, the rotor time constant parameter is adjusted downward. If the value if negative, the $\tau_R$ is adjusted upward. When the sign of $XD_{ERR}$ changes, the value of $\tau_R$ has passed through its correct value and the value of $\tau_R$ can be interpolated based on the previous and current values of $XD_{ERR}$ and the previous and current values of $\tau_R$ using known linear interpolation techniques.

More specifically, referring to FIG. 1, the auto-calibration logic 48 comprises $V_{dERR}$ calculation logic 50 which receives the necessary parameters to compute $V_{dERR}$ using Equation 3. The value of $V_{dERR}$ is provided on a line 52 to a multiplier 54 which multiplies $V_{dERR}$ by the speed parameter $\omega_R$ and which provides the result on a line 56 which is multiplied by the q-axis current parameter Iq by a multiplier of 58 to form the signal $DXD_{ERR}$ on the line 60. The signal $DXD_{ERR}$ is fed to an integrator 62 which provides an integrated output signal $XD_{ERR}$ on the line 64 indicative of the integral of $DXD_{ERR}$. The integrated signal $XD_{ERR}$ is fed to $\tau_R$ calculation logic 66.

Instead of multiplying $V_{dERR}$ by the values (and signs) of $\omega_R$ and Iq, either or both of these values may be replaced by just the sign of that value. Also, instead of using $\omega_R$ in the multiplier 54, $\omega_E$ may be used if desired. Multiplication by the motor speed frequency $\omega_R$ (or $\omega_E$) has the added advantage that it weighs the $V_{dERR}$ signal more heavily at high frequencies where the voltage measurement is more accurate and the motor is at rated speed.

The logic 66 provides a reset signal on a line 68 to the integrator 62 to reset the integrator to 0 between elevator runs. The logic 66 also provides the constants $L_\sigma$ and $R_1$ to the $V_{dERR}$ calculation logic 50 on a line 76. The logic 66 computes the rotor time constant $\tau_R$ and provides $\tau_R$ on the line 144 to the current regulator/motor drive circuit 20 and to the $V_{dERR}$ calculation logic 50.

The logic 66 also provides MODE and FLRCMD signals on lines 71,72, respectively, to the motion control logic 10. The MODE flag causes the motion logic 10 to accept floor commands from the FLRCMD signal on the line 72.

The FLRCMD signal commands the motion controller 10 to perform an elevator run in a commanded direction for a commanded number of floors (or to a particular destination floor) using a standard predetermined speed profile for $W_{REF}$ (FIG. 6) in the motor control 10, discussed hereinafter. The motion control logic 10 also provides a motor controller fault signal MCFAULT on a line 73 to the logic 66 to indicate if a fault has occurred during an elevator run. During the elevator run, the elevator is run through a normal speed profile using an empty car with the normal safety features enabled.

Figure 6:
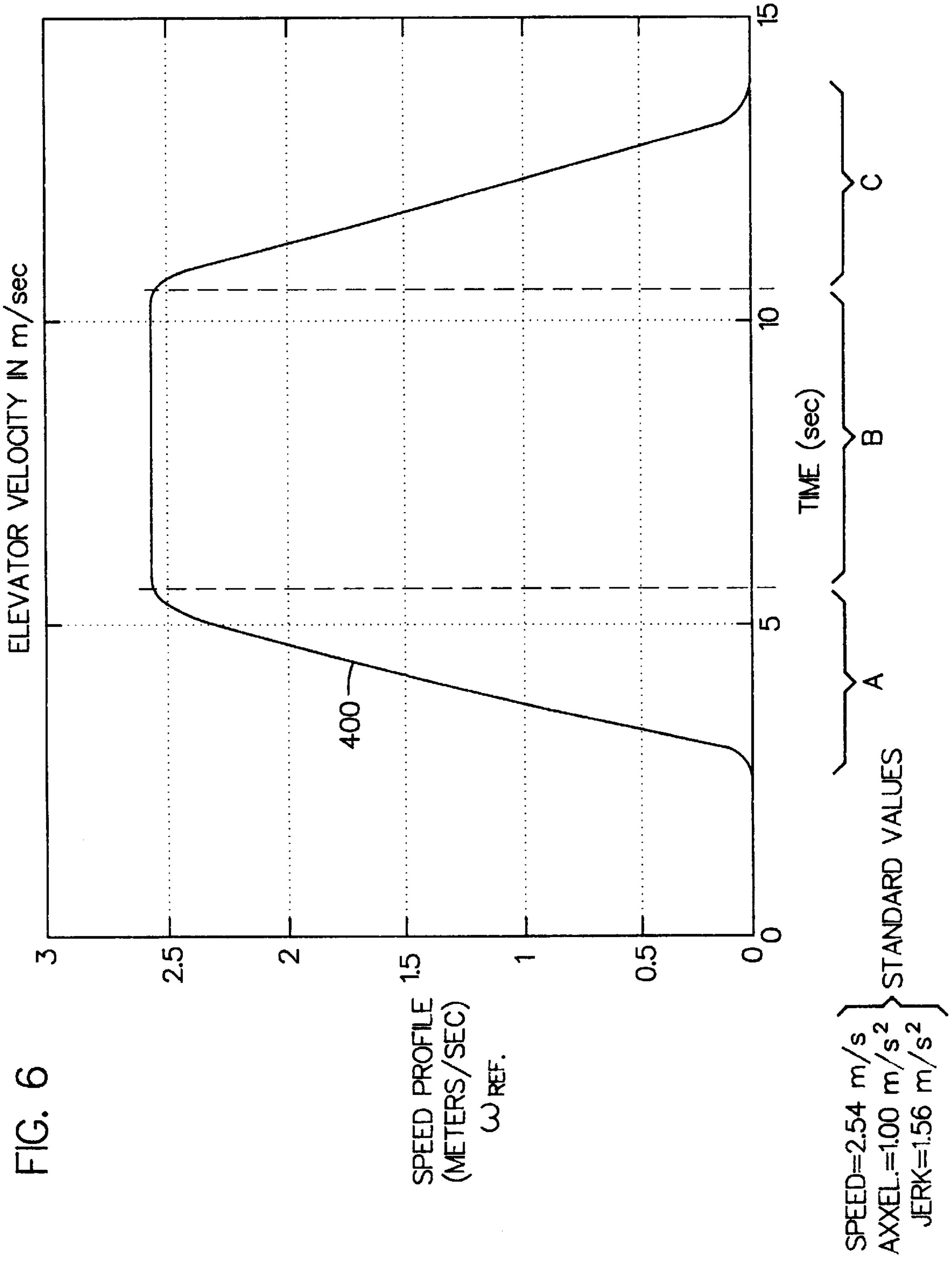
FIG. 6 is a graph of an elevator speed reference profile versus time, in accordance with the present invention.

Referring to FIG. 6, a standard speed profile 400 for $W_{REF}$ provided by the motion control logic 10 has a ramp up region A, a constant speed region B (where the motor runs at the duty or contract speed for a given application), and a ramp down region C. The duration of the constant speed portion B is based on the number of floors (or destination floor) commanded by the FLRCMD signal. Whenever an up or down elevator run is commanded herein, the number of floors commanded are such that the constant speed portion B of the elevator run has a duration long enough to allow transients in the system to stabilize, e.g., at least about 3 seconds, which corresponds to about 3 or 4 floors, depending on the building floor height. The profile 400 is merely for illustration purposes and other ramp up/down rates, duty speeds, and overall profiles may be used, provided there is a constant speed portion having a duration long enough to allow system transients to stabilize. The number of floors or destination floor may be provided by the service tool 80 over the link 82.

The calculation logic 66 also communicates with a service tool 80 over a serial link 82. The service tool 80 includes a display 84 and a keypad (or keyboard) 86 for entering data into the service tool 80 and over the link 82 to the controller 7. In particular, the logic 66 receives a Start command and a Stop command over the link 82 from the service tool 80, which controls when auto-calibration is started and stopped (or aborted), respectively. Also, the logic 152 receives parameters necessary to perform the auto-calibration logic 48, discussed more hereinafter. The logic 66 also provides a DONE signal and a FAULT signal to the service tool 80 over the link 82. The DONE signal indicates when auto-calibration is complete and the FAULT signal indicates when a fault has been detected during auto-calibration.

The elevator motion commands (destination floors) may be entered manually using the service tool 80, or, alternatively, the elevator may be set up to cycle between two predetermined floors using the service tool 80. Also, to simplify implementation and maximize safety, all motion of the elevator may be under control of the normal elevator control systems and all normal hoistway safety functions may be in effect.

Figure 5:
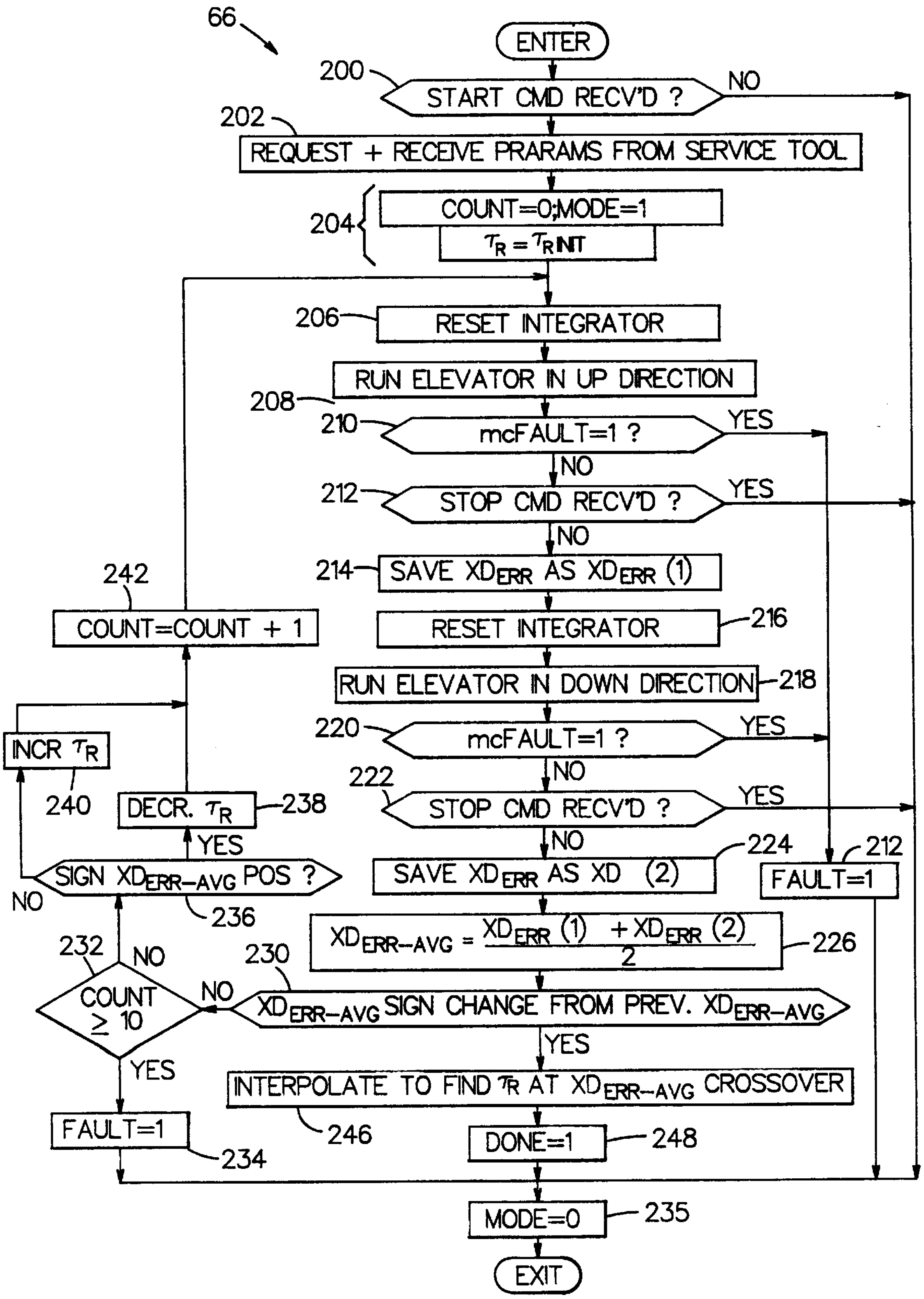
FIG. 5 is a logic flow diagram of a portion of the auto-calibration logic of FIG. 1, in accordance with the present invention.

Referring to FIG. 5, a top-level flow diagram for the auto-calibration logic 66 begins at a step 200, which checks whether a Start command has been received from the service tool 80 (FIG. 1). If a start command has not been received, the logic 66 exits. If a start command has been received, a step 202 requests and receives the necessary parameters to perform the auto-calibration logic 48, such as Lσ, $R_1$, $I_{dREF}$, $\tau_{R\text{-}INIT}$ (initial value for $\tau_R$) from the service tool 80.

Some or all of the parameters $R_1$, Lσ, $\tau_{R\text{-}INIT}$, $I_{dINIT}$ may be set based on the values of $R_1$, Lσ, $\tau_R$, $I_{dRATED}$, respectively, previously calculated by another motor test, such as that described in Copending U.S. Patent application, Serial No. (Otis Docket No. OT-3064).

Alternatively, some or all of the parameters Lσ, $\tau_{RINIT}$, $I_{dINIT}$ may be approximated as follows:

$L\sigma = Ls - (Lm^2/Lr)$ $\tau_{R\text{-}INIT} = Lr/Rr$ $I_{dINIT} = I_{NO\text{-}LOAD}$ where $R_1$ is the stator winding resistance, Ls is the stator winding inductance, Lr is the rotor winding inductance, Lm is the motor mutual inductance, Rr is the rotor winding resistance, and $I_{NO\text{-}LOAD}$ is the no load current and where $R_1$, Ls, Lr, Lm, Rr, and $I_{NO\text{-}LOAD}$ are obtained from the motor data sheet. In that case, the service personnel may calculate the parameters Lσ, $\tau_{RINIT}$, $I_{dINIT}$ and provide them and $R_1$ to the logic 48 by the service tool 80. Alternatively, the service personnel may provide the parameters $R_1$, Ls, Lm, Lr, Rr, and $I_{NO\text{-}LOAD}$ to the logic 48 by the service tool 80, and the logic 48 calculates the parameters Lσ, $\tau_{RINIT}$, $I_{dINIT}$. Other techniques may be used to obtain the initial parameters necessary to carry out the present invention.

It should be understood by those skilled in the art of motors that $I_{NO\text{-}LOAD}$ is equal to the total motor current when the motor is under no load or torque, i.e., Iq=0. Thus, $I_{NO\text{-}LOAD}$ is equal to the rated d-axis (or magnetizing) current $I_{dRATED}$.

Next, a series of steps 204 sets a variable COUNT to 0, sets the MODE flag to one, and sets the rotor time constant $\tau_R$ equal to the initial value $\tau_{R\text{-}INIT}$. Then, a step 206 resets the integrator 62 (FIG. 1) to 0. Next, a step 208 commands the elevator to run in the up direction using the standard profile discussed hereinbefore (FIG. 6). Then a step 210 checks whether a fault was detected during a run of the elevator. If so, a fault signal is set to 1 in a step 212 and transmitted to the service tool 80 (FIG. 3).

Next, a step 212 checks whether a stop command has been received from the service tool 80. If it has, the logic exits. If not, a step 214 saves the value of $XD_{ERR}$ as a parameter $XD_{ERR}$ (1). Then, a step 216 resets the integrator 62 to 0 for the next run of the elevator.

Next, a step 218 commands the elevator to run in a down direction using the standard profile discussed hereinbefore (FIG. 6). Then, a step 220 checks whether a fault has occurred during the run of the elevator. If it has, the step 212 sets the FAULT flag and the logic exits. If it has not, the step 222 checks whether a stop command has been received from the service tool. If it has, the logic exits. If it has not, the logic saves the value of $XD_{ERR}$ as $XD_{ERR}$ (2) in a step 224.

Next, a step 226 computes $XD_{ERR\text{-}AVG}$ as the average of $XD_{ERR}$ (1) and $XD_{ERR}$ (2) for the current up/down run of the elevator. Then, a step 230 checks whether $XD_{ERR\text{-}AVG}$ has changed sign from the $XD_{ERR\text{-}AVG}$ of the immediately preceding elevator up/down run. If $XD_{ERR\text{-}AVG}$ has not changed sign, a step 232 checks whether the COUNT variable is equal to or greater than 10, i.e., whether the loop has iterated at least ten time. If the loop has iterated ten times, a step 234 sets the FAULT flag equal to 1 which is sent over the link 82 (FIG. 1) to the service tool 80, and a step 235 sets MODE=0, and the logic exits. If the loop has iterated less than ten times, a step 236 checks whether the sign of $XD_{ERR\text{-}AVG}$ is positive, and, if it is, a step 238 decreases $\tau_R$ by a predetermined amount, e.g., 10 percent. If the sign of $XD_{ERR\text{-}AVG}$ is not positive, a step 240 increases $\tau_R$ by a predetermined amount, e.g., 10 percent. Other percent changes to $\tau_R$ may be used if desired. Next, a step 242 increases the COUNT by 1 and the logic proceeds to step 206 again.

If $XD_{ERR\text{-}AVG}$ has changed sign in step 230, a step 246 linearly interpolates between the values of $XD_{ERR\text{-}AVG}$ for the previous and the current elevator runs and the corresponding values of $\tau_R$ for the previous and current runs to determine the value of $\tau_R$ at which $XD_{ERR\text{-}AVG}$ crosses through zero (i.e., changes sign). Next, a step 248 sets the DONE flag equal to 1 which is sent to the service tool 80 over the serial link 82 (FIG. 1), the step 235 sets the MODE flag to 0, and then the logic exits.

In steps 226, 230, 236 and 246, instead of evaluating $XD_{ERR\text{-}AVG}$, either $XD_{ERR}$ (1) or (2) may be used individually; however, using the average value $XD_{ERR\text{-}AVG}$ provides a more robust value for $\tau_R$. In that case, if, for a given up/down run of the elevator, the value of $XD_{ERR}$ (1),(2) have different signs the value for $\tau_R$ is deemed close enough to stop iterating. If, however, the values for $XD_{ERR}$ (1),(2) both change signs together, one of the parameters $XD_{ERR}$ (1) or (2) is selected to use to interpolate for the value of $\tau_R$.

Figure 7:
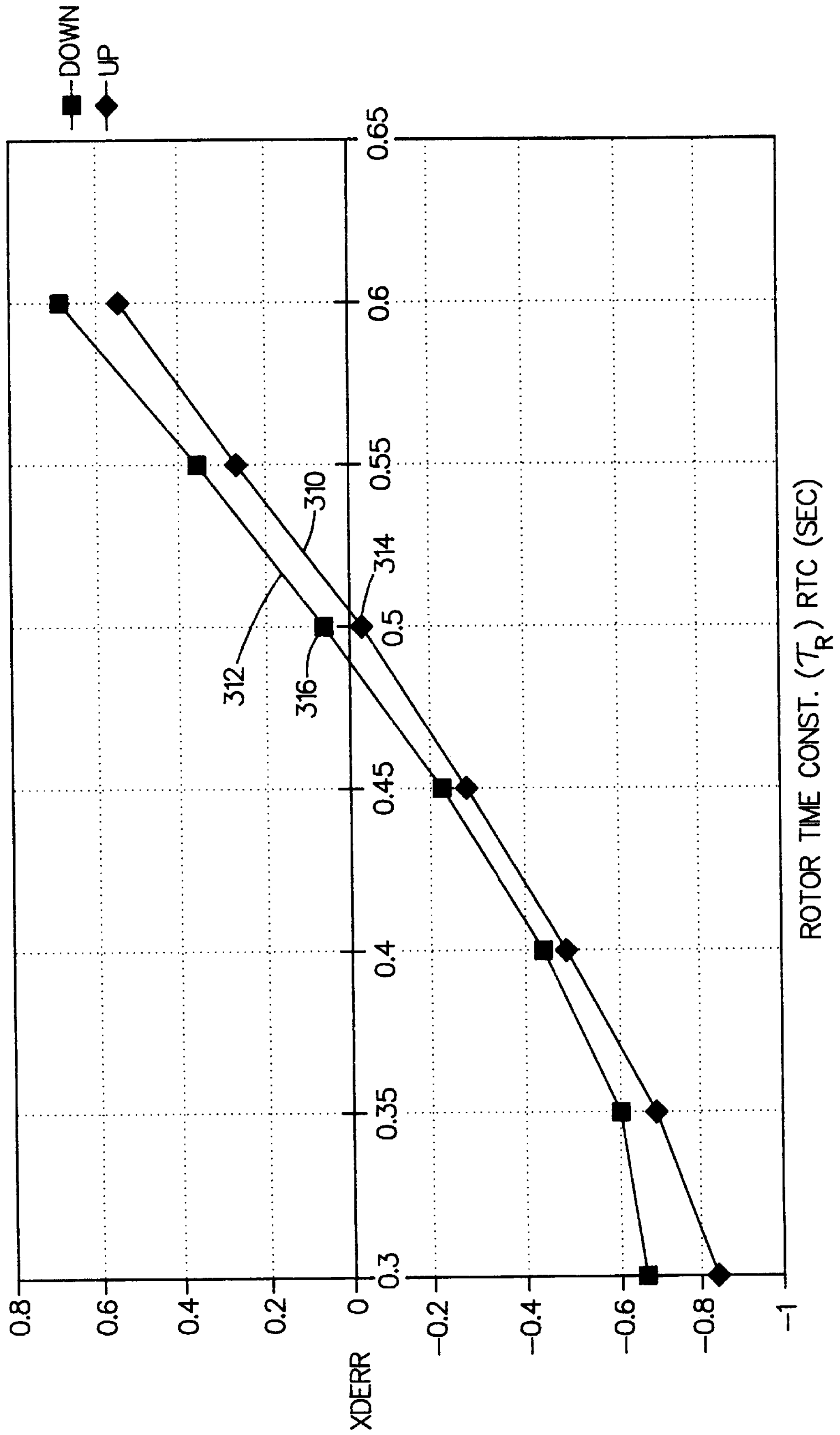
FIG. 7 is a graph of $XD_{ERR}$ versus rotor time constant for a series of up and down runs of an elevator, in accordance with the present invention.

Referring to FIG. 7, a graph of $XD_{ERR}$ versus rotor time constant $\tau_R$ (in sec.) is plotted for seven runs in the up direction shown by a curve 310 and seven runs in the down direction shown by a curve 312. Typically, the up and down runs are alternated as indicated in the logic 66 before changing $\tau_R$ to the next value. Thus, the up run values are indicated by the curve 310 and the down run values are indicated by the curve 312. The objective of the interpolation process discussed hereinbefore is to obtain the value of $\tau_R$ which corresponds to a value of $XD_{ERR}$ equal to 0.

Other search techniques may be used if desired to iterate to the correct value of $\tau_R$. An alternative search algorithm for $\tau_R$ is to use a binary type search where the search range is narrowed in successive runs until the change in $\tau_R$ or $XD_{ERR}$ is within a predetermined tolerance.

The order of direction for the up-down elevator is run is not critical to the present invention, e.g., the elevator may be run down in the step 208 and up in the step 218 (FIG. 5). However, typically, service personnel will run the elevator to the ground or first floor to begin service or calibration. In that case, running the elevator up first may be necessary to provide a run which has a long enough duration, as discussed hereinbefore with the standard profile.

While an empty car may be the easiest condition to obtain, the invention will also work at full load or partial load, provided a net load imbalance is achieved between the car and the counterweight. However, for a load condition (such as full load) which causes a net load imbalance such that the car is heavier than the counterweight, the graph of FIG. 7 would have a negative slope instead of a positive slope, and the search logic would change correspondingly.

Instead of the integrator 62, a low pass filter or other type of filter may be used to filter transients in DXDERR and provide an average value of DXDERR over a given elevator run. In that case, the output of the filter 62 may be sampled by the logic 66 prior to the motor speed $\omega_R$ going to zero, e.g., during the constant or duty speed portion of the run.

Alternatively, instead of using the integrator (or filter) 62, the signal $DXD_{ERR}$ may be sampled directly by the logic 66 without a filter or integrator. In that case, the logic 66 would sample the value of $DXD_{ERR}$ at the end of (or during) the constant speed portion of the run in steps 214, 224 (FIG. 4) and $DXD_{ERR}$ would replace XDERR where ever it is referenced herein. Alternatively, instead or in addition to filtering $DXD_{ERR}$, the input signals to Eq. 4 for $DXD_{ERR}$ may be filtered. Alternatively, the $VD_{ERR}$ calculation logic 50 may calculate $VD_{ERR}$ only when the motor speed is above a certain speed or has been at duty speed for a predetermined period of time.

Although the invention has been described and illustrated with respect to exemplary embodiments thereof, it should be understood by those skilled in the art that the foregoing, and various other changes, omissions and additions may be made without departing from the spirit and scope of the present invention.

What is claimed is:

1. A method for calculating a rotor time constant ($\tau_R$) of an elevator motor operated by a field-oriented controller, comprising the steps of:

a) setting $\tau_R$ to an initial value;

b) running the elevator in a first direction;

c) calculating an error signal ($V_{dERR}$) during the elevator run as follows:

$$V_{dERR}=Vd-R_1Id+(\omega_R+Iq/(Id\tau_R))L\sigma Iq$$

where:

Id=d-axis current

Iq=q-axis current

Vd=d-axis voltage $\omega_R$=motor speed $R_1$=motor stator resistance $L\sigma$=motor transient inductance where Vd, Id, Iq, $\omega_R$, are signals provided by the field-oriented controller;

where $R_1$ and $L\sigma$ are predetermined motor constants;

d) calculating a sign-adjusted error signal ($DXD_{ERR}$) during the elevator run as follows:

$$DXD_{ERR}=V_{dERR}\times(\text{sign of } Iq)\times(\text{sign of } \omega_R);$$

and e) varying $\tau_R$, performing steps (b)–(d), and determining the value of $\tau_R$ at which $DXD_{ERR}$ equals zero, within a predetermined tolerance.

2. The method of claim 1, wherein said step of varying (e) comprises:

f) varying $\tau_R$ until $DXD_{ERR}$ changes sign; and g) performing a search algorithm to determine the value of $\tau_R$ at which $DXD_{ERR}$ crosses through zero, within a predetermined tolerance.

3. The method of claim 2 wherein said search algorithm comprises interpolating between the values of $DXD_{ERR}$ and $\tau_R$ for current and previous elevator runs.

4. The method of claim 1, wherein said step (d) further comprises filtering $DXD_{ERR}$ with a filter during the elevator run.

5. The method of claim 4 wherein said filter comprises an integrator.

6. The method of claim 1, wherein said step (d) further comprises the steps of:

i) running the elevator in a second direction, opposite to said first direction;

j) repeating steps (c)–(d) during the elevator run in said second direction; and k) computing the average value of $DXD_{ERR}$ for the two elevator runs as $DXD_{ERR}$.

7. The method of claim 1, wherein said step of varying (e) further comprises:

f) varying $\tau_R$ and performing steps (c)–(d) and (i)–(k) until $DXD_{ERR}$ changes sign; and g) performing a search algorithm to determine the value of $\tau_R$ at which $DXD_{ERR}$ crosses through zero, within a predetermined tolerance.

8. The method of claim 7 wherein said search algorithm comprises interpolating between the values of $DXD_{ERR}$ and $\tau_R$ for current and previous elevator runs.

9. The method of claim 1 wherein said steps (a)–(e) are performed automatically upon receiving a command from a service tool.

10. The method of claim 6 wherein said steps (a)–(e) and (i)–(k) are performed upon receiving a command from a service tool.

* * * * *